United States Patent [19]

Fenton, Jr. et al.

[11] 4,351,431
[45] Sep. 28, 1982

[54] HEAVY DUTY BELT CONVEYOR

[75] Inventors: Edward A. Fenton, Jr., Pittsburgh; Ira W. Lakin, Volant; Gilbert Blair, Corapolis, all of Pa.

[73] Assignee: Dravo Corporation, Pittsburgh, Pa.

[21] Appl. No.: 166,466

[22] Filed: Jul. 7, 1980

[51] Int. Cl.³ .............................................. B65G 15/08
[52] U.S. Cl. ..................................... 198/823; 198/838
[58] Field of Search ............... 198/819, 821, 823, 831, 198/838

[56] References Cited

U.S. PATENT DOCUMENTS

| 155,882 | 10/1874 | Morris . | |
|---|---|---|---|
| 2,650,695 | 9/1953 | Robins . | |
| 2,656,035 | 10/1953 | Thomson et al. . | |
| 2,821,290 | 1/1958 | Duncan | 198/823 |
| 2,838,164 | 6/1958 | Duncan . | |
| 2,865,494 | 12/1958 | Duncan | 198/823 |
| 3,082,857 | 3/1963 | Holloman | 198/823 |
| 3,126,090 | 3/1964 | Bitzer . | |
| 3,289,817 | 12/1966 | McLaughlin . | |

FOREIGN PATENT DOCUMENTS 746771  3/1956  United Kingdom ............... 198/823

OTHER PUBLICATIONS

"High Efficiency Soviet Conveyor Handles Bulky Run-of-Mine Ore", E/MJ Magazine, Oct. 1977, by Dr. K. Mulukhov.

Primary Examiner—John J. Love
Assistant Examiner—Douglas D. Watts
Attorney, Agent, or Firm—Parmelee, Miller, Welsh & Kratz

[57] ABSTRACT

The load carrying upper reach of a belt conveyor particularly useful for transporting large pieces of rock and other heavy bulk material dispenses with the usual idle troughing rollers and is supported by an endless succession of spaced transverse flexible cross members or hammocks each of which has a trolley at each end riding on endless rails extending along each side of the belt and around the rollers at the head and discharge ends of the belt conveyor. Along the return strand of the conveyor belt the hammocks are above the belt but rest on it. The side-to-side distance between rails is less than the width of the conveyor belt so that the weighed belt cradles itself in the hammocks. However, at the head end of the conveyor there is a decending traveling belt ramp and at the discharge end an upwardly sloping belt ramp to flatten the hammocks and the belt for passage around the head and tail pulleys respectively. In these areas, the rails spread apart to take up the slack in the hammocks. An impact support is positioned under the belt and the hammocks at the place where the material to be transported is charged onto the belt to cushion the fall of heavy masses onto the belt.

16 Claims, 6 Drawing Figures

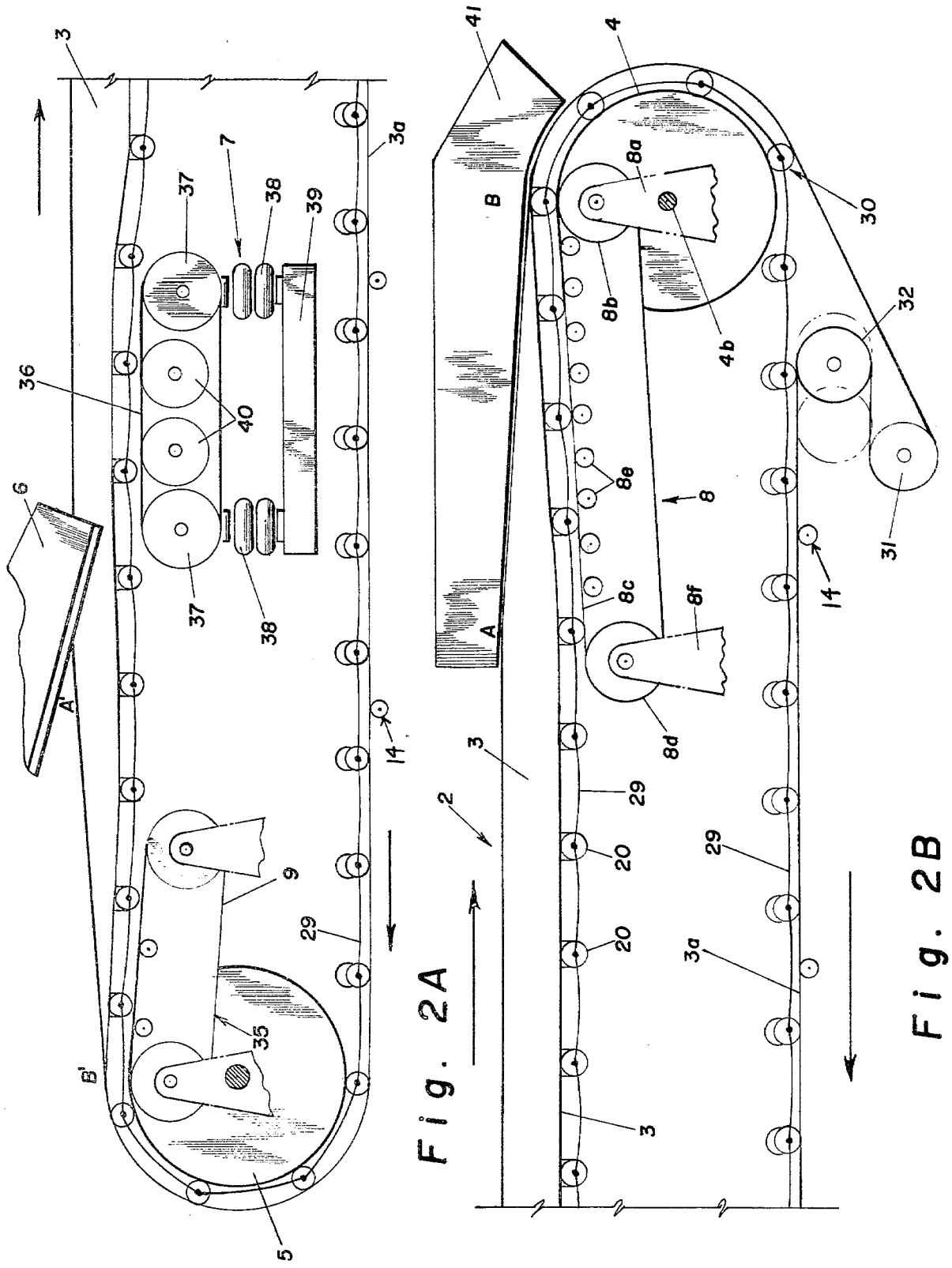

HEAVY DUTY BELT CONVEYOR

BACKGROUND OF THE INVENTION

This invention is for a heavy duty belt conveyor especially designed for the transportation of coarse, lumpy material, particularly coarse, rough rock of diverse sizes and shapes, but the conveyor may, of course, be used for the transporation of other bulk materials. It will be herein described for its primary intended purpose but without limitation thereto.

Rock or like mineral deposits as quarried, for example, may comprise a heterogeneous mixture of chunks and pieces of irregular size and shape and some lumps are quite large and heavy, pieces that may be of the order of five feet in diameter or more through one section being not uncommon. Troughed belt conveyors are desirably used for transporting such material from one location to another and as now constructed the loaded belt is supported at intervals on fixed idler troughing rolls. The heavily loaded belt, moving from one idler roll to the next, is subjected to a succession of impacts which results in rapid deterioration of the belt and reduced idler life. This is accelerated with the severe bumping and jolting that occurs with the loading of the belt, as well as in transporting the heavy load, and especially large pieces of rock.

We are aware that some attempts have been made in Russia to overcome this problem, or at least relieve it by providing a succession of cars under the belt which cradle and support the loaded belt in place of the usual troughing rolls, but this is a cumbersome and costly expedient and provides no satisfactory relief for the initial impact of the rock being loaded onto the belt at the loading station or with the shifting of the load on the belt at the transition end of the conveyor where the belt lifts off the supporting cars to pass around the discharge pulley where unloading takes place, and provision for the return travel of the cars to the starting position and the operation thereof is an expensive necessity.

BRIEF DESCRIPTION OF THE INVENTION

The present invention provides, in place of fixed, troughing rolls or cars as above described, regularly spaced flexible slings, which we term "hammocks" extending crosswise beneath the belt and which have a trolley at each of their ends that travels along a rail. There is one of these rails at each side of the belt, as well as around the head and discharge ends of the conveyor. These hammocks are connected to one another at their respective ends by flexible connectors, such as chains, that maintain them in proper spaced relations to each other. The belt is supported by the hammocks in a transversely troughed section along the load carrying upper reach of the conveyor, but where, in the return reach of the belt there is no load on the belt, it is then supported in the usual way on straight idler rolls with the hammocks inverted above the belt, but resting on the belt.

At the loading station near the head end of the conveyor the hammocks with the overlying belt resting on them, ride in succession over an impact table at the location where the belt, previously cradled on the hammmocks, moves under a charging chute from which it receives the rock to be transported by the conveyor. This impact table, itself comprising an endless belt, is supported on cushioning means to absorb the violent impact of the material being charged onto the conveyor belt from the charging chute.

At the discharge end of the conveyor where the load is discharged over the discharge or tail pulley arrangement, the side rails above referred to are inclined downward and spread laterally away from the longitudinal center of the belt to keep the hammock support trolleys at a correct distance as a transition unit flattens out the belt.

The straightening of the hammocks to flatten the loaded troughed belt is accomplished by a transition support in the nature of an upwardly inclined ramp comprised of one or more endless belts along which the successive hammocks are supported and as they move up this incline each in turn straightens out, thereby lifting the belt to gradually flatten it transversely of its line of travel as it approaches the roll at the unloading end of the conveyor. In so doing the belt passes around the roll as an ordinary flat belt across its entire width, that is, in passing over and partway around the roll, it assumes that shape of a half cylinder with the outer edges of the belt the same distance from the axis of rotation of the roll as the center line. This being so, there is no differential in velocity of the edges of the belt and the center, as would be the case as there would be if the belt were passed around the roll in a troughed or V-shaped cross section, where, because in the difference in radii, the edge of the "V" being further from the center of rotation have a greater linear speed than the center at the bottom of the "V" which would be on a shorter radius.

The flattening out of the belt takes place with only slight shifting of the load on the belt and minimizes any destructive movement of the load on the belt.

At the hand end of the conveyor, as the belt travels off the main head pulley there is a generally similar but reversed ramp sloped downward in the direction of travel of the upper reach of the conveyor such that as the hammocks move forward an increasingly deep cradle forms thereby allowing the conveyor belt to settle down into an increasingly deep trough shape, which however may not reach its full depth before the impact table is reached. The trolley rails at each side of the belt at this end are of course, contoured reversely to the rails at the transition area in order to effect the increasing concave curvature of the hammocks as they travel away from the head pulley.

The use of the flexible hammock support of this invention allows the conveyor belt to conform to the load shape, thus reducing impact and abrasion. The capacity of the conveyor to absorb impact can be increased further if desired by providing spring mountings for the rails which support the hammock trolleys.

BRIEF DESCRIPTION OF THE DRAWINGS

The invention may be more fully explained by reference to the accompanying drawing in which a present preferred embodiment of the invention is illustrated, and in which.

Figure 1:
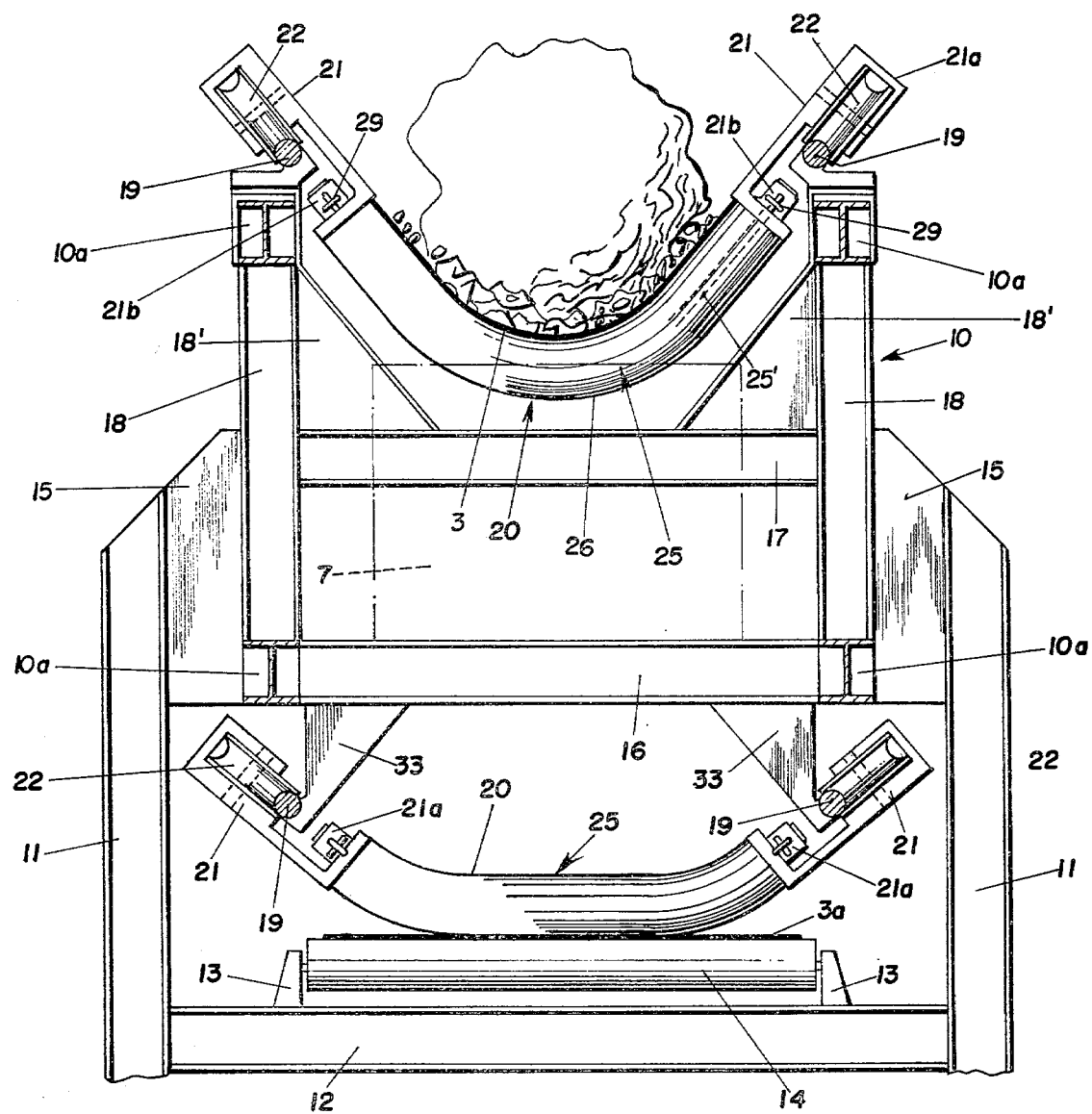
FIG. 1 shows somewhat diagramatically a typical transverse section through the conveyor between the impact table and transition support.

Because of the small scale of the drawing, FIG. 2 comprises FIGS. 2A and 2B, FIG. 2A showing diagramatically the head or loading end of the conveyor and 2B the tail or discharge end.

Figure 3:
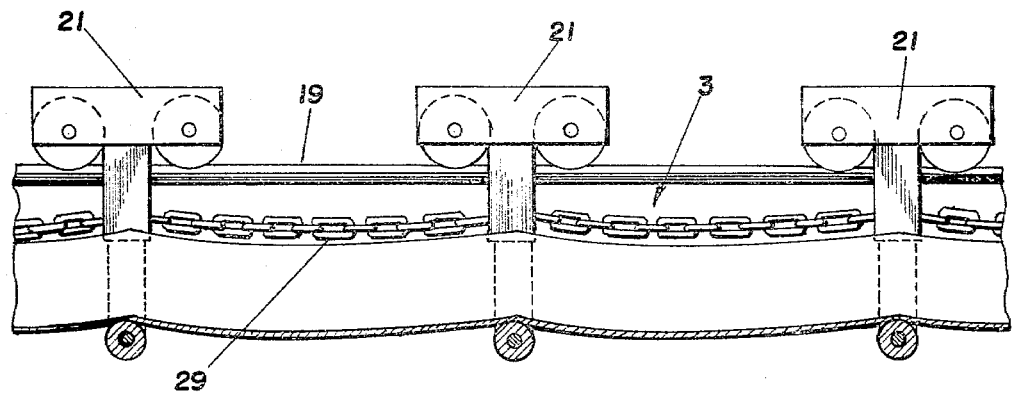

FIG. 3 is a schematic longitudinal section on a larger scale than FIG. 2A and 2B of a short length only of the conveyor, showing in side elevation the general contour of the trolleys.

Figure 4:
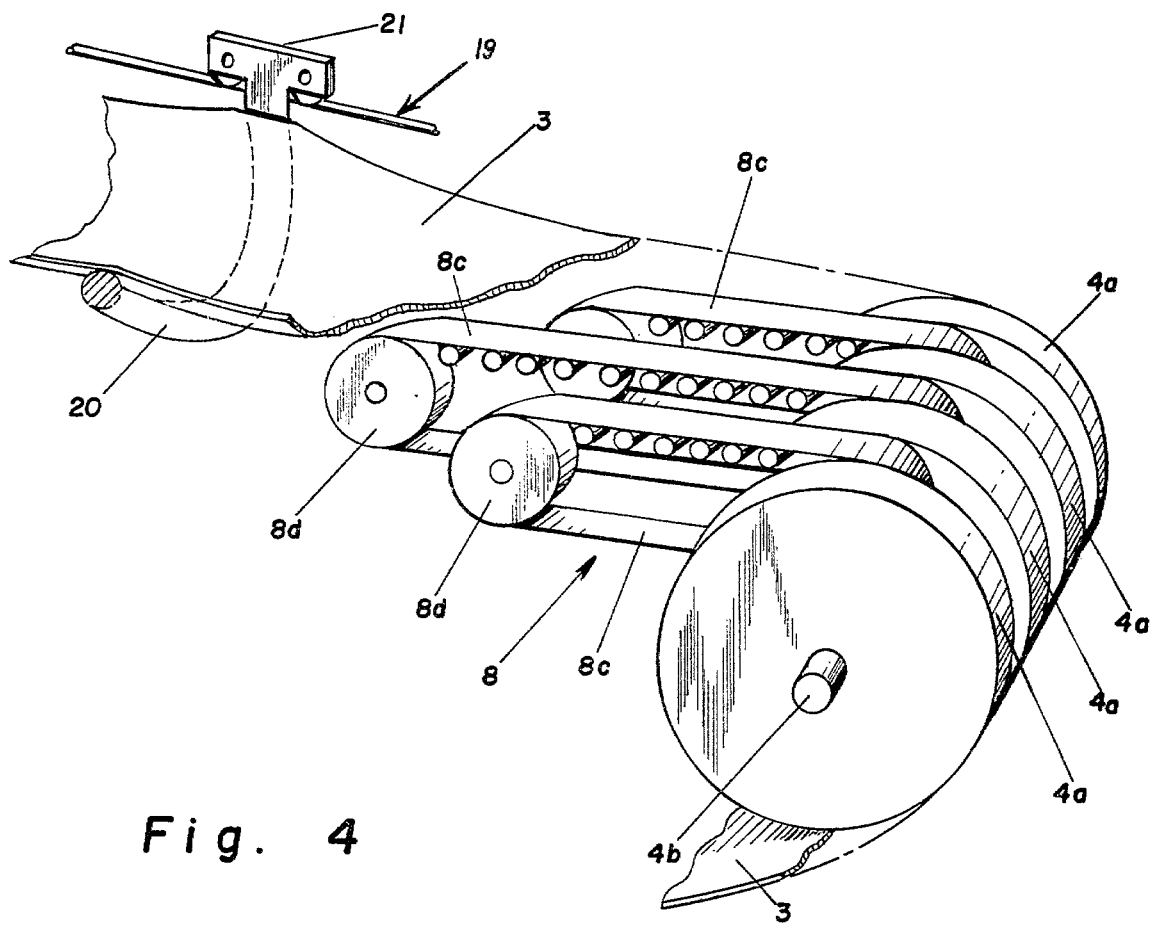

FIG. 4 is a schematic perspective of the main pulley at the discharge end of the conveyor and the transition support forthe belt, the dip in the far edge of the belt indicating its flattening and widening out.

Figure 5:
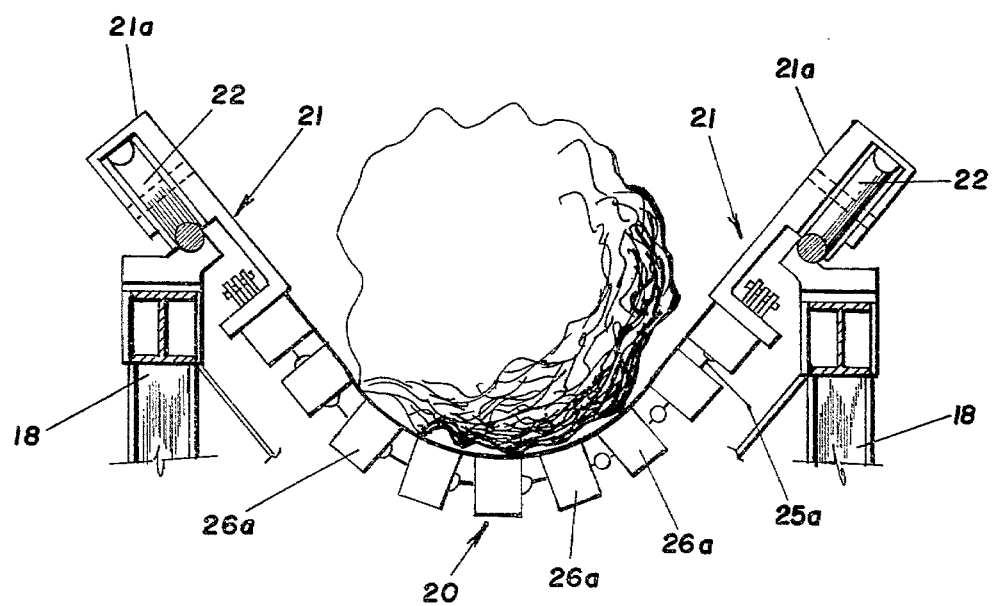

FIG. 5 is a fragmentary view in a plane corresponding to FIG. 1 showing a modified form of hammock.

DETAILED DESCRIPTION

Referring to the drawings, and first to FIGS. 2A and 2B, the endless belt conveyor is designated generally as 2, and 3 is the upper or load carrying reach of the belt and 3a is the lower reach. The tail pulley at the discharge end is designated 4, and 5 is the head pulley.

The rock feed chute 6 is indicated schematically in FIG. 2A near the loading end, or as here shown, the left end, of the conveyor from which material is to be transported discharges onto the upper reach 3 of the conveyor. Below the loading end of the chute and beneath the belt at a level where the bottom of the belt is raised slightly is the impact table 7, which will be hereinafter more fully described. The transition support, FIG. 2B to also be hereinafter more fully described, is designated generally as 8, and 9, FIG. 2A designates a generally similar but reversed construction at the head end of the conveyor.

The conveyor frame structure is not shown in FIG. 2 but one embodiment of a suitable cross frame structure 10 used at intervals between the two ends of the conveyor is shown in FIG. 1 with longitudinal connecting beams 10a from one support to another being illustrated in section.

Each transverse frame structure may be constructed in various ways, but for purposes of illustration, as here shown, comprises a pair of spaced main supporting columns 11 that may rest on or be secured at their lower ends to a foundation, not shown. There is a cross beam 12 near the lower end of these posts, but above the foundation on which are spaced bearing members 13. Between there bearing members 13 there is an idler roll 14 over which the lower or return reach 3a of the conveyor belt is carried.

Transversely extending vertical supporting plates 15 on the upper ends of the columns carry a lower horizontal beam 16 spaced well above the cross beam 12 and for purpose of rigidity there is another cross beam 17 spaced above the beam 16. Secured to the ends of beams 16 and 17 are secondary uprights 18. On top of each upright 18 at each side of the belt there is a bracket to which there is welded or otherwise secured a trolley rail 19 of round or rounded transverse section that extends substantially the full length of the upper reach of the conveyor belt, and in fact around both pulleys and along the bottom reach of the belt, being continuous elongated loops. Gussets for bracing the upper ends of the columns are indicated at 18'. In order to increase the capacity of the conveyor system to absorb impacts, the rails 19 may be secured to the uprights 18 by spring mountings rather than welding.

the hammocks previously referred to, designated generally as 20, each comprise a pair of opposed trolley units 21, each unit in turn having a somewhat modified C-shaped body member as viewed in FIG. 1 but which as shown in elevation in FIG. 3 has the top portion 21a elongated in the direction of travel of the trolley. With this construction the elongated "closed" top of the letter C accommodates (one or) two longitudinally spaced trolley wheels 22 symmetrically located and mounted for rotation therein. The trolley wheels have grooved or concaved peripheries to conform to the shape of the rail 19 on which they travel so that the center of curvature of the concave periphery of the wheel is in radial alignment with the center of curvature of the rail surface along which the trolley travels.

The part of the trolley that might be termed the base of the letter C (and which unlike the top is not closed) has a fixed lug at 21b centered transversely of the structure 21 in the same plane as the trolley wheels to which one end of the cradle or hammock 25 is attached. As shown in FIG. 1 the hammock comprises a length of cable 25 about which is an integral cylindrical body of a tough elastomer 26 extending continuously from one trolley to the other, the cable having each of its ends attached to the lugs 21b of a trolley at each side of the conveyor.

The hammock, however, may be constructed in other forms, as for example the flexible connection being a cable with a trolley at each end may be a link chain 25a (see FIG. 5) and instead of one continuous cylinder of elastomer 26 there may be a series of spaced cylindrical sections 26a. Also, while it is desirable that these be cylindrical in section, it is unnecessary. They might be polygonal or even flat in transverse section. Instead of the lug 21b as in FIG. 1 there are shown in FIG. 5 parallel or split lugs with a cross pin to which the chain 25a is anchored.

Lengthwise of the belt the trolleys along each side are connected into an endless succession by flexible connectors such as chains 29.

As shown in FIG. 1 the belt is cradled to a considerable depth. For example the large chunk of rock (R) in this figure on the scale to which the drawing is made is about 60 inches in diameter. However, to pass around the tail or discharge pulley, the belt must be flattened and to accomplish this the rails 19 approaching the transition roll 4 slope downwardly and laterally outwardly as indicated from A to B in FIG. 2B and indicated by the dip in the far edge of the belt in FIG. 4 so that the trolleys of each hammock in turn draw their respective hammocks to a generally transversely flat or straight shape and correspondingly flatten the belt. The belt, however, is spaced from the periphery of the transition roll, a distance equal to the diameter of the hammocks which are also straight but, being under the belt, hold the belt itself away from the periphery of roll 4.

To straighten the hammocks and correspondingly flatten out the belt requires some raising of the belt and its load to conform the belt to the curvature it must assume in passing around the tail or discharge pulley first requires the inclination and widening of the rails as above explained. In order to relieve the trolley, trolley rails and hammocks from excessive strain, there is provided a transition support 8. (See FIG. 2B and 3). To provide this support, the discharge pulley is a composite comprised of a series of spaced drums 4a along a central shaft 4b (See FIG. 4). Support means 8a, FIG. 2B, through which shaft 4b passes provide bearings for support pulleys 8b of a diameter less than the radius of drums 4a. Endless load supporting belts 8c pass around the pulleys 8b and slope downwardly and forwardly toward the head end of the conveyor to pass around pulleys 8d with spaced supports 8f indicated in broken line only in FIG. 2B. As the cradled or troughed hammocks under the conveyor belt, moving along with the conveyor, ride up onto belts 8c they will be gradually lifted to flatten the conveyor belt as the trolleys move down the inclined and spreading rails to widen the distance between them. The raising of the load as the belts straighten is accomplished mainly by the effort of the transition support and only secondarily by the trolleys, which are enabled by their grooved rollers and the manner of connection with the hammocks to rotate in an arc about the longitudinal axes of the rounded rails from a nearly vertical position to a nearly horizontal position with changes in tension on the tolleys as the rails tend to straighten the belt from a troughed to a flat transverse section or gravity changes the contour of the belts from a flat to a troughed section. The endless belts 8c of the transition support unit have closely spaced idler rolls 8e to hold them flat and support the weight as the belts 8b travel up the moving ramp which is thus provided. As indicated in FIG. 4, the middle belts of this supporting ramp or more properly, transition support, which will first contact the very lowest center area of the hammocks may be longer than the ones at the side, which come into play later. The belts are driven by contact with the conveyor.

The trolley rails 19 at each side of the conveyor belt remain in the spread position which holds the hammocks straight as the conveyor belt passes around the discharge pulley 4. After passing sufficiently far around the periphery of the discharge pulley to be clear of falling material, the conveyor diverges at about location 30 on a tangent from the path of travel of the hammocks to pass around conveyor belt drive roll 31 and slack take up roll 32. The belt driving system per se is conventional and has not been shown. Separating in this manner the belt remains flat in passing around these two rolls. It is important for this reason, among others, that the hammocks are not attached to the belt. Following this, the belt converges with the now horizontal return path of travel of the hammocks. In this return span of travel, the belt travels over idler rolls 14. The hammocks, being now above the belt as shown in FIG. 1, with the trolley rails 19 hung in an inverted position from the structural frame by brackets 33, sag down to rest in a shallower troughed contour than they do along the upper reach. Resting in this manner on the return reach of the conveyor belt, the continuous succession of hammocks is moved in unison with the load carrying belt and with the hammocks under the top reach between the head and discharge ends of the conveyor moving in isochronism with the belt. In FIG. 1 the wider distance between the columns 11 that the distance between columns 18 shows the greater width of the belt 3 when on the return reach it is flat as contrasted to its narrower overall width when it is cradled on the hammocks along the upper reach.

At the head end of the conveyor where the belt travels upwardly around the head pulley 5 the trolley rails again widen to straighten the hammocks, but the belt, being already flat and having no load of loose material thereon has no transition support as it approaches the head pulley. However, as the upper reach of the belt travels away from the top of the head pulley 5, there is desirably a transition support or ramp 35 comprised of endless belts arranged similarly to the transition support at the discharge end of the conveyor but with the supporting belts, like the upper reach of the conveyor, having their load supporting surface traveling away from the head pulley. This supports and assures a gradual transition of the hammocks from a substantially straight conditin to a fully cradled contour. In FIG. 2A of the drawing, the upwardly diverging top line and the downwardly sloped lower line from B' to A' leading from the uppermost level of the head pulley and being the reverse of line A to B in FIG. 2B, illustrate the narrowing in and upward slope of the trolley rails and the increasing depth of trough of the belt, respectively, as the spread between the trolley rails decreases and the hammocks sag to an increasing depth.

However, before the belt has troughed to its full depth, its supporting hammocks come to ride on the top reach of a relatively short, endless supporting belt 36 forming the top of impact table structure 7 that is below and which temporarily supports the conveyor belt and its hammocks as the conveyor belt passes under the feee chute 6. This provides sufficient slack in the hammocks and belt to minimize or substantially eliminate if not entirely, the transmission of impact stresses through the hammocks to the rails. Because of the small scale of the drawing, details of the structure of the table are not shown except that the rolls 37 at each end of the belt 36 are separately supported on cushioning means 38 here indicated as cushions or some resilient media, either fluid, or springs, or both.

These cushions in turn are carried by a rigid foundation structure 39 spanning the space above the return reach 3a of the conveyor. This unit breaks the force and reduces the destructive effect of the rocks and particularly large heavy chunks and pieces as they are discharged from the chute onto the troughed conveyor belt. The hammocks are preferably spaced sufficiently close that there will always be at least two hammocks on the impact table belt at one time. Large idler rolls 40 are indicated under the top reach of the impact table belt between the end pulleys 39.

Fixed side guards may be provided along the sides of the belt at the discharge pulley where the hammocks and the belt are opening out from a transversely troughed to a flat contour to confine the rock on the belt, one of said guards being indicated at 41.

The hammocks, traveling with the belt are driven by contact with the belt and have no separate drive of their own. The chains 29 at each end of the hammocks connecting one another assure the entire series of hammocks moving as a unit with the belt, but allow flexibility to accommodate the repeated successive straightening and shortening of the hammocks during the cycles of their travel. They take the place of carts as heretofore described and eliminate fixed spaced troughing rolls with the destructive bumping action heretofore mentioned and, in conjunction with the impact table, provide flexibility to minimize the destructive effect of heavy masse repeatedly being loaded by gravity onto the moving belt.

We claim:

1. In an endless belt conveyor having an endless power driven conveyor belt with a top reach extending between a head end and a discharge end and having roller means at the discharge end about which the upper reach travels to discharge material loaded onto it and from which the belt extends along a return reach below the upper reach to be guided by roll means to the head end of the upper reach, and wherein there is a means for loading material to be transported onto the top reach of the conveyor belt and be discharged therefrom at the discharge end of said conveyor, the invention wherein:
   (a) there is an endless succession of spaced flexible hammocks extending crosswise of the belt conveyor arranged to move in an endless path with the conveyor belt and with the hammocks under and supporting the top reach of the conveyor belt when the belt is loaded, said endless series of hammocks being arranged to travel with the belt about the discharge end of the belt and then travel along a lower reach above the return reach of the conveyor belt and return to the top reach of said belt at the head end of the conveyor;

(b) a continuous endless rail disposed along each side of the entire conveyor belt including the head and discharge ends of the belt conveyor;

(c) each of said hammocks having a trolley at each end supported on and movable along the rails and movable radially through an arc transverse to the axis of respective rails along which they move; and (d) means through which the belt and the endless series of spaced hammocks are driven in unison.

2. An endless belt conveyor as defined in claim 1 in which the belt is driven directly from a power drive, the hammocks are connected together into an endless series by flexible connections and are driven by contact of the hammocks with the power driven conveyor belt.

3. An endless belt conveyor as defined in claim 2 in which the power driven belt and the hammocks travel in isochronism between the head and discharge ends of the upper reach of the conveyor belt to avoid shifting of the support for the belt and disturbance of the load being transported, but are unattached to the belt.

4. An endless belt conveyor as defined in claim 1 wherein the distance between the rails at each side of the top reach of the conveyor belt throughout the length of said top reach other than the sections immediately following the head and preceding the discharge end of the top reach of the belt is less than the full width of the conveyor belt whereby the hammocks sag and the conveyor belt progressive cradles itself lengthwise into a trough.

5. An endless belt conveyor as defined in claim 4 in which the rails diverge from each other and slope downwardly immediately preceding the discharge end of the conveyor in order to gradually remove the sag and allow the belt to flatten in a direction transverse to its length before it passes around the roll means at the discharge end and wherein the rails immediately following the roll means at the head end converge to said narrow width and slope upwardly to a level above the level of the edges of the belt when it is troughed.

6. In an endless conveyor belt especially useful for transporting rough, heavy material and particularly broken rock that may comprise at least in part large, heavy fragments and pieces where the belt has a top reach moving from around a main pulley at the head end toward and around a discharge pulley at the opposite end, the invention comprising:

(a) an endless succession of flexibly connected spaced transverse flexible hammock members extending under said top reach of the conveyor belt, said hammock members each having a flanged trolley-wheel at each end, a pair of spaced parallel rails, one extending along each side and so spaced that the hammocks sag from their respective trolley wheels toward the center of the belt, and the loaded belt shapes itself into a continuous trough conforming to the shapes of the hammocks, (b) means for driving the belt and hammocks in unison, (c) the rails for the trolley wheels at the ends of the hammocks spreading apart and decreasing in elevation, with respect to belt, at the approach to the pulley at the discharge end of the belt in such manner as to cause the hammocks to straighten out and the belt to become flat in the direction transverse to its length as it passes around the discharge pulley of the conveyor.

7. The invention defined in claim 6 wherein the return reach of the belt is supported on straight idler rolls and the rails at each side of the belt close to the beginning of the return travel of the belt are again at a level above the belt, and come closer together to then extend in parallelism with each other along the length of the return travel of the conveyor at a distance where the hammocks sag down onto the belt to be thereby carried along by the belt, with the loaded belt supported on the hammocks on the upper reach, thereby providing a drive for moving the hammocks with the belt but free of any mechanical connection between the belt and the succession of flexibly connected hammocks.

8. The invention defined in claim 6 wherein there is an inclined transition support upon which the hammocks successively move to effect the transition of the hammocks and the belt from a deeply troughed condition to a transversely substantially straight flat contour.

9. The invention defined in claim 8 wherein the inclined transition support comprises at least one endless belt which moves in the direction of travel of the belt and at substantially the same speed.

10. The invention defined in claim 8 in which the inclined transition support comprises at least one center with a shorter belt beginning further up the incline than the longer one, but terminating at the top of the incline even with the longer one.

11. The invention defined in claim 10 wherein the discharge pulley is comprised of spaced drumlike sections with aligned pulleys of smaller diameter in each of the spaces between said sections of the discharge pulley and which are axially aligned with each other, one each of the several belts of the transition support passing around one pulley of smaller diameter.

12. The invention defined in claim 9 wherein the belt comprising the inclined transition support is driven by contact with said hammocks.

13. The invention defined in claim 9 in which the rails and transition support at the head end of the conveyor are provided in a functionally opposite manner to their counterparts at the discharge end of the conveyor.

14. The invention defined in claim 6 in which there is means above the upper reach of the belt near the head end for delivering bulk material into the conveyor and there is an impact table below the belt and the supporting hammock beneath the delivery means located at a level spaced between the beginning of the upper reach of the conveyor belt but above the level where the belt is fully troughed under the weight of the load to provide support for the hammocks and belt along which the hammocks and belt move to cushion the impact of the load being dumped into the belt from said load delivering means while substantially avoiding the transmission of impact stresses from the hammocks to the rails.

15. The invention defined in claim 14 in which said impact table comprises an endless belt moving in the direction of the conveyor belt and which in turn is supported on fixed cushioning means.

16. The invention defined in claim 14 in which the endless belt of the impact table and the hammocks under the conveyor belt are so spaced that there will always be at least two hammocks at any time traveling over the impact table.

* * * * *